Feb. 6, 1934.  A. C. SAXE  1,945,825
SHAFT SEAL
Filed Feb. 13, 1932

INVENTOR.
Arthur C. Saxe
BY
Corbett & Mahoney
ATTORNEYS.

Patented Feb. 6, 1934

1,945,825

UNITED STATES PATENT OFFICE 1,945,825

SHAFT SEAL

Arthur C. Saxe, Columbus, Ohio, assignor to The Jaeger Machine Company, Columbus, Ohio, a corporation of Ohio Application February 13, 1932. Serial No. 592,670

6 Claims. (Cl. 286—11)

My invention relates to a shaft seal. It has to do, more particularly, with a seal for the shaft of a centrifugal pump, although it is not necessarily limited thereto.

In the prior art, it has been found that the various types of shaft seals that are now commonly in use are not entirely satisfactory. This is particularly true with the shaft seals which are commonly used on shafts of centrifugal pumps. One form of device which is commonly used for this purpose consists of an ordinary packing gland which is fitted around the shaft. However, the fluid which passes through a pump of this type is usually laden with sand or other solids, which work underneath the packing gland and render it ineffective to prevent leakage around the shaft. Furthermore, rotation of the shaft causes the sand or other solid, which has worked between the packing gland and the shaft, to produce considerable wear on the packing gland, packing and shaft, so that it frequently has to be replaced.

Other devices are used for the purpose indicated but they are all possessed of certain undesirable features. When a centrifugal pump is used to pump water to a high level there is a considerable back pressure set up in the pump. In prior art devices, this back pressure affects the shaft seal and causes leakage of water around said shaft. When the pump is used to pump water to a comparatively low level there is considerable suction set up in the pump which also affects prior art seals and causes leakage of air into the pump. If this leakage is very great, it will prevent proper operation of the pump.

One of the objects of my invention is to provide a shaft seal which is extremely simple and which is effective to prevent leakage around the shaft.

Another object of my invention is to provide a seal for the shaft of a centrifugal pump which is of such a type that the back pressure or suction forces set up in the pump will not affect the seal in such a manner as to permit leakage around the shaft.

Another object of my invention is to provide a seal for a shaft which is of such a type that it will be practically impossible for sand or silt to get between the various parts of the seal and thereby render it ineffective to prevent leakage.

Another object of my invention is to provide a shaft seal which has a minimum amount of surface subject to wear and which has means for lubricating such surfaces which are subject to wear.

In its preferred form my invention contemplates the provision of a seal which is particularly useful as a seal for the shaft of a centrifugal pump. This seal is of such a type as to prevent leakage of water from the impeller chamber of the pump and which will also preclude the entrance of air into said chamber. It is of such a type that suction forces or the back pressure of the water will not affect its efficiency. My invention further contemplates the provision of a means for lubricating the surfaces of the seal which are subjected to the most wear.

The preferred embodiment of my invention is shown in the accompanying drawing wherein similar characters of reference designate corresponding parts and wherein.

Figure 1:
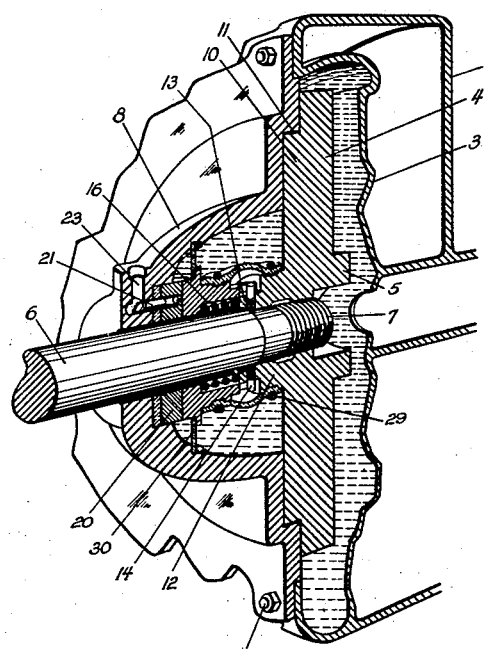
Figure 1 is a perspective view, partly in section, of a portion of a centrifugal pump having a seal, made in accordance with my invention, mounted on the shaft thereof.
Figure 4:
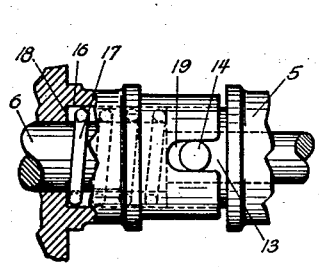
Figure 4 is a detail showing how the sleeve of my shaft seal is connected to the hub of the impeller.

With reference to the drawing I have shown a portion of a centrifugal pump which comprises a container 1 having an impeller chamber 3 eccentrically disposed therein. This impeller chamber is of volute form.

An impeller 4 is mounted within the chamber 3. This impeller 4 is provided with a hub portion 5 which is internally threaded. The impeller 4 is adapted to be mounted on the inner reduced end of a shaft 6 and the inner end of this shaft is provided with threads 7, which cooperate with the threads on the inner surface of the hub 5. The shaft 6 may be driven by any suitable type of prime mover.

The container 2 is provided with an outwardly projecting housing 8 which is bolted thereto by means of bolts 9, or which is secured thereto in some other suitable manner. The housing is preferably of the shape shown in the drawing, for a purpose which will be later explained, and the walls thereof preferably flare outwardly from a point at the outer end of the housing to a point adjacent its inner end. The sealing means for the shaft is adapted to be mounted within this housing, as will be later seen. The impeller 4 is provided with a disk-like portion 10, the outer edge of which is adapted to fit into a socket portion 11 formed in the inner wall of the housing 8.

An outwardly extending portion 12 is provided on the hub 5. This portion has an outwardly extending reduced portion 13. This portion 13 carries a plurality of pins 14 which are threaded into such portion and are circumferentially spaced around the outer periphery thereof.

A sleeve member 15 is loosely mounted on the shaft 6 adjacent the portion 12 of the hub 5. This sleeve is provided with a socket portion 16 in which is adapted to be mounted a compression spring 17 which also surrounds said shaft. One end of this spring 17 abuts against the outer end of hub 5 while the other end abuts against the inner portion of a flange 18 which is formed on the outer end of the sleeve. The inner end of this sleeve is provided with a plurality of open-ended slots 19 and is adapted to overlap the reduced portion 13 of the hub 5. The open ended slots are adapted to fit around the pins 14 so that the sleeve 15 will be connected to the hub 5 and will rotate therewith but will be movable longitudinally with relation to the sleeve.

Figure 2:
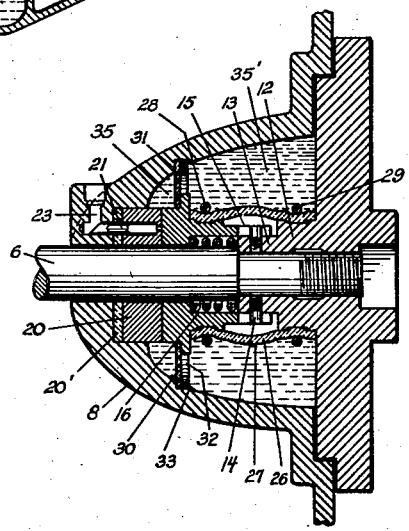
Figure 2 is a longitudinal section of the structure shown in Figure 1.
Figure 3:
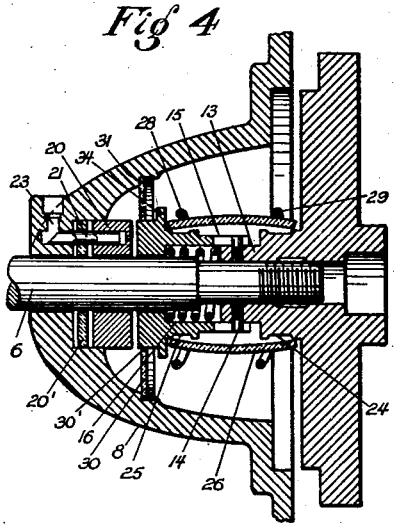
Figure 3 is a sectional view similar to Figure 2 but showing the various parts of my seal in spaced disassembled relation.

A bushing 20 is loosely mounted on the shaft 6 directly adjacent to the outer end of the sleeve 15. This bushing is preferably made of bronze or some other soft metal so that it will be the member that wears rather than the sleeve 15, as will be hereinafter understood. A gasket 20', preferably made of rubber, is adapted to be mounted between this bushing and the outer wall of the housing 8 in order to make a watertight and airtight joint around the outer end of the shaft. The bushing 20, gasket 20' and the outer wall of the housing 8 are provided with horizontal openings which coincide with each other. These openings are adapted to receive a tubular member 21 which is inserted therein and which is free to move longitudinally in the opening in gasket 20' and in the opening in the housing. The outer end of this tubular member communicates with a vertical bore 23 formed in the outer wall of the housing 8, which may be provided with a fitting adapted to be connected with a force feed lubricating device. This bore 23 is provided with an enlarged lower portion 23', as shown in Figures 2 and 3.

The horizontal opening in the bushing 20 is greatly reduced in diameter adjacent its inner end to form a passage 21' which is adapted to conduct lubricant to the inner face of bushing 20. The tubular member 21 will, therefore, not extend entirely through bushing 20 but its inner open end will abut against a portion of said bushing, at that point where the reduced passage 21' begins. The tubular member 21 is of such a length that slight longitudinal movement thereof will be permitted without interference between the outer end of such member and the wall of the enlarged portion 23' of the bore 23. Furthermore, this tubular member is of such a length that its outer end will always extend into the lower portion of bore 23 (Figure 2). As will be readily understood, longitudinal movement of the tubular member 21 will be caused by movement of bushing 20.

When the bushing 20 is moved to the left, (Figure 2) it compresses the gasket 20' between such bushing and the wall of the housing. This will prevent leakage of air or liquid around the shaft 6. Furthermore, leakage of lubricant around the tubular member 21, at the time it is being forced into my device, will be precluded, due to the fact that the gasket will be compressed around the periphery thereof. Thus, lubricant may be forced into my device without escaping before it reaches the proper surfaces.

It will be readily understood that the tubular member 21 anchors the bushing 20 and the rubber gasket 20' to the outer wall of the housing 8. It will also be seen that the sleeve 15 will be positively driven by the hub 5 and that the bushing 20 and gasket 20' will remain stationary. It will further be seen that the contacting surfaces of the bushing 20 and sleeve 15 as well as the shaft 6 may be lubricated through the medium of the bore 23, the tubular member 21 and passage 21'. Furthermore, the gasket 20' will prevent leakage of the lubricant around the shaft.

The portion 12 of the hub 5 is further provided with a groove 24 which is formed in the outer periphery thereof. The inner portion of the sleeve 15 is provided with a similar groove 25. A rubber sleeve 26 is adapted to be mounted in surrounding relation to the sleeve 15 and the portion 12 of the hub. One end of this sleeve 26 contacts with the outer portion of flange 18 while the other end contacts with the impeller. This sleeve is adapted to prevent the water from flowing down into the socket 16 in the sleeve 15 and also to preclude the entrance of air into the housing 8 in the event that it passes between the rubber gasket 20' and the shaft 6, into this socket. Furthermore, this rubber sleeve is so disposed as to prevent flow of the water containing sand or other extraneous material around the shaft 6 thereby preventing wear on the shaft and the other parts of the seal.

This rubber sleeve is preferably of such a length that when it is positioned on the sleeve 15 and portion 12 of the hub, there will be produced a bulge as at 27. This rubber sleeve may be secured in position by means of wires 28 and 29 which cooperate with the grooves 24 and 25. As will be understood hereinafter, the bulge in the rubber sleeve is provided so that the back pressure, which is set up in the housing 8, will press down on this sleeve and will tend to force the sleeve 15, bushing 20, gasket 20' and the wall of the housing 8, more intimately in contact with each other.

It will be understood, however, that the spring 17 is of sufficient length and sufficient strength to keep these various parts in intimate contact and that the back pressure, set up in the housing 8, will also aid in doing this. The spring will also take up the wear between the various parts and the rubber sleeve 26 is of such a length as to permit longitudinal movement between the sleeve 15 and the hub 5 for this purpose. Furthermore, it will be obvious that the spring 17 will resist any suction force which is set up in the housing 8 and which tends to pull the various parts away from each other. If desired, the rubber sleeve may be replaced by a corrugated copper sleeve, or a sleeve made of any other suitable material, which will tend to become longer because of the back pressure set up in the housing.

I also preferably provide a flap valve 30 which is mounted within the housing 8 and which is adapted to form two chambers, 35 and 35' within the housing. However, it is not absolutely necessary to use this valve in my device. This valve comprises a rubber collar which is mounted in surrounding relation to the outer end of the sleeve 15. The upper end of this rubber collar is held in place against a shoulder 31 formed on the inner-periphery of the housing 8, by means of a snap ring 32 which is mounted in a groove 33 also formed in the inner surface of the housing. A shoulder 34 is formed on the inner edge of the flange 18 of the sleeve. This shoulder is adapted to preclude movement of the inner edge of the rubber collar 30' inwardly.

It will be understood that this one-way valve 30 will permit liquid to flow into the chamber 35 formed between such valve and the outer end of the housing until this chamber is filled. However, after the chamber 35 is filled the flap valve will be closed and this will prevent the free circulation of the water containing the sand or other extraneous material from the chamber 35' into the chamber 35. It will also be understood that the small amount of sand which gets into the chamber 35 will be whirled around with such a force that it will tend to reduce the sand or other extraneous material to a powder so that the material will be dissolved or almost dissolved. Those particles which are not dissolved will be thrown away from the contact point of the bushing and the sleeve by the centrifugal force and will not work therebetween. It will be further understood that most of the extraneous material passing through the pump will never reach the point at which the sleeve 15 and the bushing 20 contact because of the flap valve.

In assembling this device, the inner end of the rubber sleeve 26 is mounted on the portion 12 of the hub 5. Then the spring 17 is placed against the outer end of the hub and the sleeve 15 is then placed over the spring. This sleeve is positioned so that its inner end overlaps the reduced portion 13 of the hub and the slots 19 surround the pins 14. Then the outer end of the rubber sleeve 26 is mounted on this sleeve. The shaft 6 is then inserted in the assembly and is screwed into the impeller 4. After this the tubular member 21 is used to anchor the bushing 20 and gasket 20' together and these members are placed on the shaft. The flap valve 30 is then mounted in the housing 8 and this housing is placed on the shaft. The horizontal opening in the wall of the housing is lined up with the outer end of the tubular member 21 and the housing is then moved inwardly on the shaft until it can be bolted to the main casing of the pump 1, thereby forcing all the parts of the seal into close contact.

When the centrifugal pump is used to pump water to a comparatively high level there will be considerable back pressure set up in the housing 8. This will exert a pressure on the rubber sleeve 26 and will tend to elongate it. This will in turn cause the sleeve 15, bushing 20, gasket 20' and the wall of the housing 8 to be forced more intimately into contact with each other. The spring 17 is of such a strength and length that it will also keep these various parts in intimate contact with each other. The rubber sleeve 26 will also aid in precluding the entrance of air into the housing 8 and in precluding leakage of water from the housing.

It will be understood that the sleeve 15 will rotate with the shaft 6 and that the bushing 20 will remain stationary so that most of the wear will be between these surfaces. However, the contacting surfaces of bushing 20 and sleeve 15 may be lubricated which will reduce the wear. Furthermore, this lubricant between these surfaces will also aid in preventing leakage therebetween. Rotation of the sleeve 15 will set up a centrifugal force and will tend to throw any sand or dirt particles away from the joint between the outer end of this sleeve and the bushing 20 thereby preventing entrance of such particles between these two members. It will further be obvious that any suction force, which is usually set up in the housing 8 when the pump is being used for pumping water to a comparatively low level and which tends to pull the various parts of the seal apart, will be off-set by the force of the spring 17 which will maintain the various parts in intimate contact.

When the flap valve is used, rotation of the sleeve 15 will, by centrifugal force, cause particles of sand to be thrown outwardly therefrom with such force that, when they strike the flared walls of the housing 8, they will be directed inwardly toward the main portion of the pump and away from the flap valve. Thus, most of the sand particles will never reach the point where the shoulder 24 and the flap valve contact. If the flap valve is not used, the same action will occur at the point where the sleeve and bushing 20 contact with each other. That is, there will be a centrifugal force set up at this point which will throw the particles of sand outwardly with considerable force and these particles will be directed inwardly towards the pump and away from the sealing surface by means of the flared walls of the housing 8.

It will be obvious that although I have illustrated my seal as being applied to the shaft of a centrifugal pump it may be used on other pumps or as a seal for shafts of other devices.

It will be understood from the above description that I have provided a shaft seal which has many desirable features. This shaft seal is simple and is effective to prevent leakage around the shaft. This seal is not rendered ineffective either by a back pressure, which may be exerted thereon, or a suction force. Furthermore, it is practically impossible for sand or other extraneous material to get between the various parts of the seal and to cause wear on such parts. Then too, I have provided means for lubricating the parts which are most subject to wear, thereby increasing the life of such parts.

Having thus described my invention what I claim is:

1. A seal for a shaft comprising a sleeve mounted on the shaft and adapted to rotate therewith, a bushing loosely mounted on said shaft and in contact with the outer end of said sleeve, a gasket loosely mounted on said shaft between said bushing and the wall of a housing in which said seal is disposed, means for anchoring said bushing and said gasket to the wall of the housing, said means comprising a tube adapted to extend through openings in said bushing and said gasket and into an opening in the wall of said housing, said tube being also adapted to convey lubricant to the contacting surfaces of said sleeve and said bushing.

2. A seal for the shaft of a rotating pump comprising a rotating member and a stationary member, said members contacting with each other, said seal being disposed in a housing mounted on said pump, and a flap valve for preventing the free circulation of fluid between the pump and that portion of the housing containing said contacting members.

3. A seal for the shaft of a centrifugal pump comprising a sleeve mounted on said shaft adjacent the impeller of said pump, slots formed in the inner end of said sleeve, said slots being adapted to cooperate with pins on the hub of said impeller in securing the sleeve thereto, a socket formed in said sleeve, a compression spring mounted in said socket and having one end contacting with said hub and the other end contacting with the outer end of the socket in the sleeve, a bushing loosely mounted on said shaft in contact with the outer end of said sleeve, said spring being adapted to keep said bushing and said sleeve in intimate contact at all times, said seal being mounted in a housing on the pump and a flap valve for preventing the free circulation of fluid to that portion of the housing containing the contacting sleeve and bushing.

4. A seal for the shaft of a rotary pump, said seal being disposed in a housing mounted on said pump and comprising a sleeve mounted on said shaft adjacent the rotor of said pump, slots formed in the inner end of said sleeve and adapted to cooperate with pins on the hub of said rotor so that the sleeve will rotate therewith, a socket formed in said sleeve, a compression spring mounted in said socket and having one end contacting with said hub and the other end contacting with the base of said socket, a bushing loosely mounted on said shaft in contact with the outer end of said sleeve, a gasket disposed between said bushing and a wall of said housing, means for conducting lubricant to the contacting surfaces of the bushing and said sleeve, said means being adapted to anchor said bushing and said gasket to said housing to prevent rotation thereof, and a flexible sleeve member mounted in surrounding relation to said first sleeve member and the hub of said rotor and having one end secured to said first sleeve and the other end secured to said hub.

5. A seal for the shaft of a rotary pump, said seal being disposed in a housing mounted on said pump, and comprising a sleeeve mounted on said shaft adjacent the rotor of said pump, means for connecting said sleeve to said rotor in such a manner that it will be positively driven thereby but will be free to move axially of the shaft, a bushing loosely mounted on said shaft in contact with one end of said sleeve, a gasket mounted on said shaft between said bushing and the wall of said housing, resilient means for maintaining said sleeve and bushing in intimate contact and for compressing said gasket between said bushing and the wall of said housing, and a flexible sleeve member mounted in surrounding relation to said first sleeve member, said flexible sleeve member being secured to said first sleeve member and said rotor with fluid-tight connections.

6. A seal for the shaft of a rotary pump comprising a rotating member mounted on said shaft adjacent the rotor of said pump and a stationary member, said members contacting with each other, said seal being disposed in a housing on said pump, a tubular member for conveying a lubricant to the contacting surfaces of said members, said tubular member being also adapted to anchor said stationary member to said housing, means for maintaining said members in intimate contact with each other at all times, and means for utilizing back pressure set up in said pump to assist in maintaining said members in intimate contact with each other, said means comprising a flexible sleeve member mounted in surrounding relation to said movable member and having one end connected to said movable member and the opposite end connected to the rotor of the pump.

ARTHUR C. SAXE.